May 3, 1960 W. A. PAINE II 2,935,709
APPARATUS AND METHOD FOR STRAIN ROD ASSEMBLY AND FILAMENT CORE
Filed March 18, 1958 2 Sheets-Sheet 1
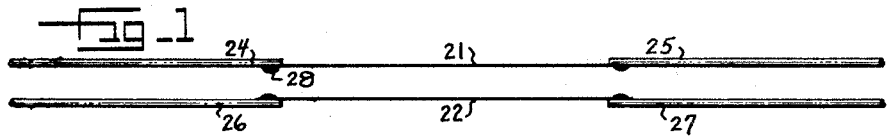
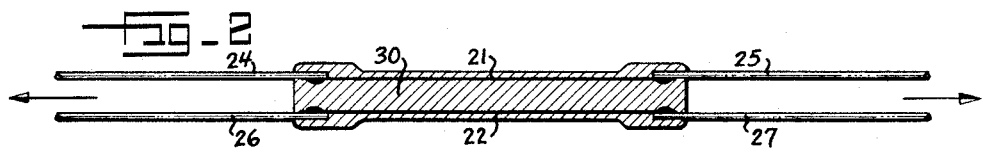
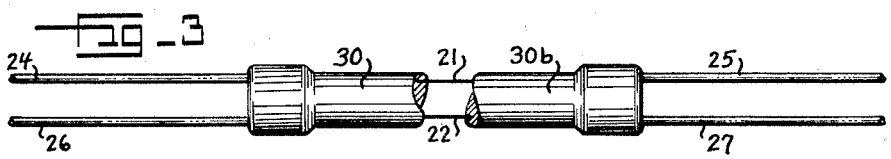
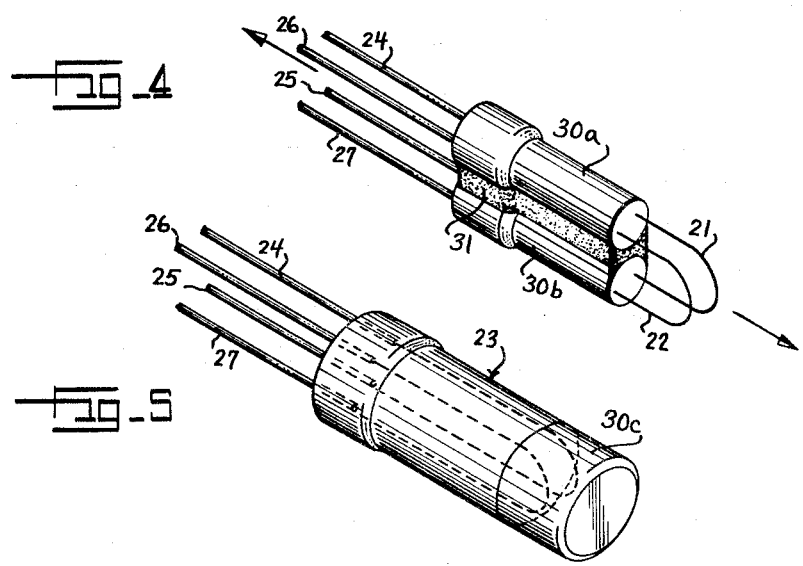
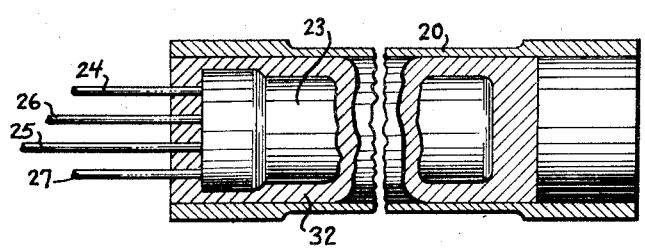
*INVENTOR.*
WILLIAM A. PAINE II
BY *Barnes & Seed*
Attorneys May 3, 1960  W. A. PAINE II  2,935,709
APPARATUS AND METHOD FOR STRAIN ROD ASSEMBLY AND FILAMENT CORE
Filed March 18, 1958  2 Sheets-Sheet 2

INVENTOR.
WILLIAM A. PAINE II
BY Barnes & Seed
Attorneys

United States Patent Office 2,935,709
Patented May 3, 1960

2,935,709

APPARATUS AND METHOD FOR STRAIN ROD ASSEMBLY AND FILAMENT CORE

William A. Paine II, Seattle, Wash.

Application March 18, 1958, Serial No. 722,283

9 Claims. (Cl. 338—2)

The present invention relates to an improved strain rod assembly containing a novel filament core and to a method of forming the core and assembly. This assembly may be used as the responsive part of a transducer or other device designed to determine strain, force, torque, displacement, linear or angular pressure, flow, vibration, acceleration, velocity, etc., or the filament core can be inserted and bonded as an independent element within a cavity provided by such a device.

The invention aims to provide an extremely accurate and sensitive strain-responsive rod assembly of simple construction which is mechanically and electrically shielded against contaminants running outside thereof and which can be readily wired in a great variety of circuits without risk of contamination.

With yet additional objects and advantages in view which with the foregoing will appear and be understood in the course of the following description and claims, the invention consists in the novel construction and in the adaptation and combination of parts hereinafter described and claimed.

In the accompanying drawings:

Figures 1–5 are schematic views illustrating progress steps in the forming of one of my filament cores;

Fig. 6 is a longitudinal sectional view of my strain rod assembly;

Figure 7:
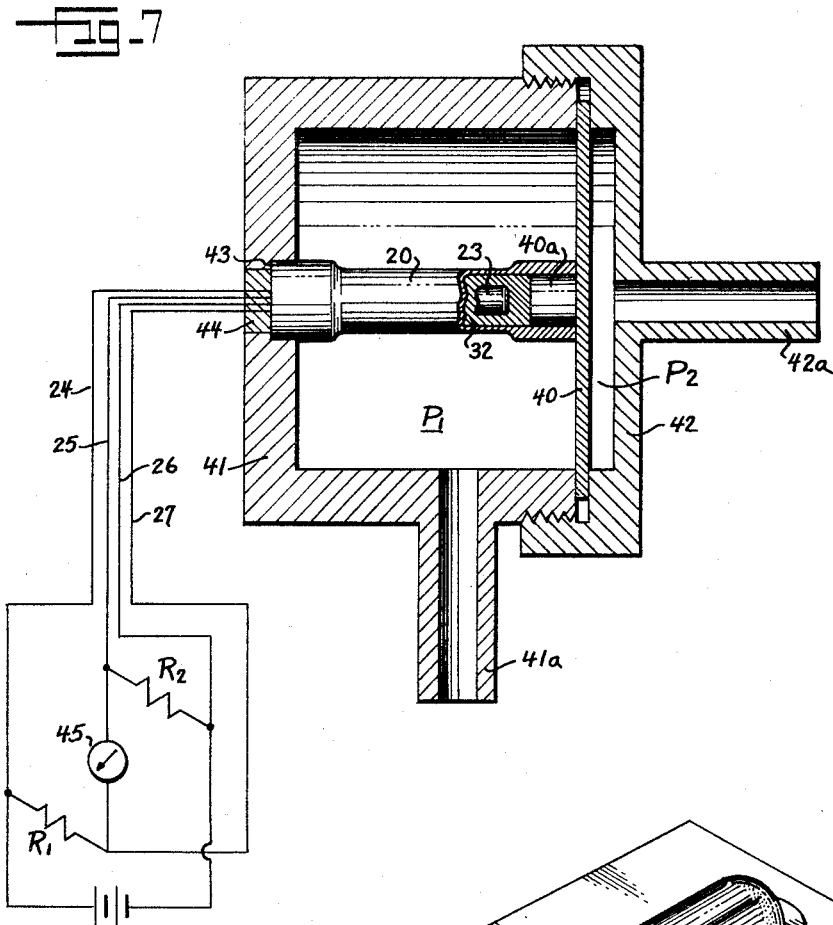
Fig. 7 is a schematic view showing a pressure transducer in longitudinal cross-section which incorporates the strain rod assembly.

Referring to the drawings, it is seen that my invention uses a cavity providing member, which may take the form of a thin-walled tubular shield 20, containing one or more circuits of high-resistance strain-responsive wire bonded together and to the member. This wire is normally of a diameter in the range of 0.4 to 1 mil. The tube 20 may be of stainless steel, and a concept of the size thereof can perhaps be realized when it is understood that tubes have been used having an inside diameter of 0.026 inch. In fact, in practice the tubes have been formed from hypodermic needle stock machined to a wall thickness as thin at 0.001 inch. One or both opposite end portions of the tube can be externally enlarged as a means of supporting end fastenings for wire terminal communications and for diaphragm or other load connections, to allow bending, twisting, or axial compression or extension of the rod assembly. For purposes of example I have illustrated an assembly equipped with two wire elements 21—22 since such is probably the most common requirement.

In order to make it possible to insert and bond the wire elements 21—22 in a small cavity such as provided by the shield tube 20, and at the same time keep the elements electrically insulated from one another as well as from the tube, I have conceived a novel filament core 23 containing the elements. The steps of forming this core are illustrated schematically in Figs. 1–5 and will now be described. First, pairs of lead wires 24—25 and 26—27 are silver soldered at 28 to the ends of the elements 21—22, respectively (Fig. 1). Then, with the lead wires, and hence the wire elements, in tension, a thin layer 30 of high-temperature electrical-insulating cement is applied to the wire elements and to the solder joints 28 (Fig. 2). This cement is dried, but desirably not to a full set condition, and a center section thereof is chipped away, thereby exposing the centers of the wire elements as shown in Fig. 3 and leaving two separated cement sections, denoted 30a and 30b. Continuing to Fig. 4 it is seen that the elements 21—22 are then doubled back at center elbows thus stacking the cement sections 30a—30b which encase the legs of the elements. Additional cement 31 is applied between these stacked sections and opposed tensioning forces applied to the elbows and the leads 24—27. Since the cement of sections 30a—30b has not fully set, these forces tension the full length of the elements 21—22. This tension is maintained while the cement thus far applied is fully hardening. The hardening holds tension in the encased wire elements after the tensioning force is then released because by this time the cement is bonded to the wire. This wire tension pre-stresses the hardened cement. As a final step in forming the filament core, I apply an additional cement section 30c over the remaining exposed center elbow portions of the elements (Fig. 5.) During all of this process the wire elements are maintained with their legs all substantially parallel to one another. The resultant filament core is only about 0.020 inch in diameter.

In Fig. 6 I have illustrated a completed strain rod assembly wherein the filament core 23 has been bonded within and to the tube 20. This is accomplished by first plugging one end of the tube and then filling the cavity with cement 32. Then the core is worked into the cement filled cavity of the tube while the cement is still soft. During this step care is exercised in keeping the cavity free of voids or air pockets as the excess cement extrudes from the open end of the tube. The operation is complete when the cement 32 is fully cured. This cement may, for example, only have a thickness of about 0.003 inches between the filament core and the inside wall of the tube. The wire leads 24—27 project beyond a common end of the tube for connections to a suitable circuit.

The cement portions 30—32 may be of the same material, and I have found that types $P_1$ and PBX cement as produced by the Robert G. Allen Company of Mechanicsville, New York, are satisfactory high-temperature electrical-insulating cements, these being by way of example only.

An application of my strain rod in a pressure transducer is shown schematically in Fig. 7. This device has a diaphragm 40 clamped between a housing 41 and a threadably received cap 42 so as to define differential pressure chambers at the opposite sides of the diaphragm, the pressures therein being denoted $P_1$ and $P_2$. Fluid ports 41a—42a are provided in the housing and cap. The diaphragm presents a plug 40a over which the strain rod 18 is secured and the other end of the rod is seated in an open-bottomed socket 43 provided in the base of the housing. Potting 44 is applied around the lead wires 24—27 which project through the floor of the socket for connection to resistances $R_1$ and $R_2$ of a Wheatstone bridge circuit. In this arrangement $R_1$ and wire element 21 (leads 24—25) become one leg of the bridge while $R_2$ and element 22 (leads 26—27) form the other leg thereof.

The resistances of $R_1$ and $R_2$ are chosen so that the current through the galvanometer 45 is zero when there is no differential pressure across the diaphragm. Thus, when pressure $P_2$ is raised above $P_1$, the strain rod will be compressed causing galvanometer current to flow because of a decrease in the resistance of wire elements 21—22 due to compression thereof. On the other hand, if pressure $P_1$ forces the diaphragm in the opposite direction, thereby elongating the strain rod and causing an increase in wire resistance, galvanometer current in the reverse direction will result. It is therefore seen that the galvonometer can be calibrated to reflect the differences in pressure between $P_1$ and $P_2$. Reflecting back on the assembling of the transducer it will be understood that the shield tube 20 can be placed in position before a filament core 23 has been bonded therein, and then the core inserted in the manner afore explained. In such a case the potting 44 could be provided by the cement used to bond the filament core to the tube.

Figure 8:
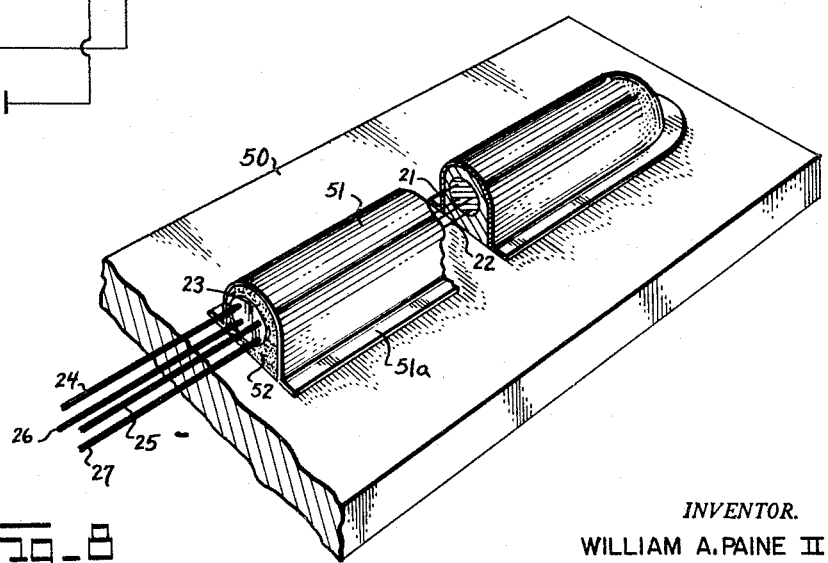
Fig. 8 is a fragmentary view illustrating a modified structure utilizing my filament core.

As a further example of the application of my invention, in Fig. 8 I have shown a cantilevered plate member 50 to be subjected to longitudinal bending stresses. An elongated shield 51 having a general hat-section has its side flanges 51a welded to the plate. The hat-section continues around one end of the shield so that the shield and plate collectively define an elongated cavity closed at one end. Into this cavity is bonded one of my filament cores 23 by cement 52 in the same manner as that afore described with relation to the tube 20. The shield and filament core have negligible resistance to bending compared to the plate 50. As before, the lead wires 24—27 project from the open end of the shield for connection to a suitable circuit to indicate changes in the resistance in the wire elements of the core responsive to longitudinal flexure of the plate 50 in either direction.

Many other uses of my invention will present themselves. For example, my strain rod assembly 18 can be used as the responsive element of a resistance bulb thermometer. Furthermore, minor changes will suggest themselves and may be resorted to without departing from the spirit of my invention. Accordingly, it is my intention that no limitations be implied and that the hereto annexed claims be given a scope fully commensurate with the broadest interpretation to which the employed language admits.

What I claim is:

1. In a filament core, a pair of spaced high-resistance strain-responsive elongated wire elements doubled back on themselves at a common end of the core, each to a general U-shape, thereby providing two pairs of element legs having free ends at the other end of the core, lead wires having respective connections with said free ends of the element legs, and an elongated cement body encasing and bonded to said elements and connections.

2. In strain responsive apparatus, an elongated filament core comprising a high-resistance strain-responsive wire element doubled back on itself to a general U-shape and under longitudinal tension, a pair of lead wires having respective connections with the free ends of said wire element, and a pre-stressed elongated cement body encasing and bonded to said element and connections; a thin-wall tubular guard free of longitudinal tension sleeved over the major length of said filament core in spaced relation thereto; and a layer of cement filling the space between said filament core and said shield and bonding them together, whereby said wire element is responsive to strain applied to said shield.

3. In a method of producing a filament core, the steps of connecting lead wires to the ends of a high-resistance strain-responsive wire element, coating all of said wire element and its connections with said lead wires with cement and thereby leaving two end sections of cement, doubling said wire element back on itself to a general U-shape with said central section as the elbow, cementing said end sections together, and then coating said central section with cement.

4. In a method of producing a filament core, coating a wire element with cement, removing a central section of said cement and thereby leaving two end sections of cement, doubling said wire element back on itself to a general U-shape at said central section, cementing said end sections together, and then coating said central section with cement.

5. In a method of producing a filament core, coating a wire element with cement, removing a central section of said cement and thereby leaving two end sections of cement, doubling said wire element back on itself to a general U-shape at said central section, tensioning said wire element, cementing said end sections together while the wire element is tensioned, keeping the wire element tensioned until all of the cement thus far applied has set, removing the tension from the wire element and then coating said central section with cement.

6. In a method of producing a filament core, coating a wire element with cement, removing a central section of said cement and thereby leaving two end sections of cement, doubling said wire element back on itself to a general U-shape at said central section, cementing said end sections together, applying tension to said wire element before any of the cement thus far applied has fully set, keeping said tension applied until all of said cement has set, removing said tension and then coating said central section with cement.

7. In a method of producing a filament core, the steps of connecting lead wires to the ends of a high-resistance strain-responsive wire element, coating all of said wire element and its connections with said lead wires with cement, removing a central section of said cement and thereby leaving two end sections of cement, doubling said wire element back on itself to a general U-shape at said central section, cementing said end sections together, applying tension to said wire element before any of the cement thus far applied has fully set, keeping said tension applied until all of said cement has set, removing said tension and then coating said central section with cement.

8. In strain-responsive apparatus, shield means defining a cavity open at one end, and a filament core bonded to the walls of said cavity, said core having a high-resistance strain-responsive wire element embedded therein and electrically insulated from said shield means, said wire element being doubled back on itself to a general U-shape providing element legs which are electrically insulated apart and terminate adjacent said open end of the cavity.

9. In strain-responsive apparatus, shield means defining a cavity open at one end, a filament core bonded to the walls of said cavity, said core having a high-resistance strain-responsive wire element embedded therein and electrically insulated from said shield means, and lead wires connected to the terminal ends of the wire element within said core and projecting from the core out of said open end of the cavity.

References Cited in the file of this patent

UNITED STATES PATENTS

| Number | Name | Date |
| --- | --- | --- |
| 1,435,392 | Heiser | Nov. 14, 1922 |
| 1,460,815 | Hynes | July 3, 1923 |
| 1,968,280 | Brian | July 31, 1934 |
| 2,164,913 | Goodchild | July 4, 1939 |
| 2,344,648 | Simmons | Mar. 21, 1944 |
| 2,586,252 | Peters | Feb. 19, 1952 |
| 2,600,029 | Stone | June 10, 1952 |

Notice of Adverse Decision in Interference

In Interference No. 92,482 involving Patent No. 2,935,709, W. A. Paine II, APPARATUS AND METHOD FOR STRAIN ROD ASSEMBLY AND FILAMENT CORE, final judgment adverse to the patentee was rendered Feb. 19, 1964, as to claims 8 and 9.

[*Official Gazette May 4, 1965.*]